United States Patent
Wanderer

(10) Patent No.: US 11,120,684 B2
(45) Date of Patent: Sep. 14, 2021

(54) WIRELESS TRANSFER OF DATA BETWEEN A COMMUNICATION TERMINAL ARRANGED IN A PRESCRIBED REGION AND A REMOTE COMMUNICATION STATION

(71) Applicant: OSRAM GmbH, Munich (DE)

(72) Inventor: Alexander Wanderer, Dachau (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 16/618,169

(22) PCT Filed: May 16, 2018

(86) PCT No.: PCT/EP2018/062788
§ 371 (c)(1),
(2) Date: Nov. 29, 2019

(87) PCT Pub. No.: WO2018/219655
PCT Pub. Date: Dec. 6, 2018

(65) Prior Publication Data
US 2020/0187283 A1    Jun. 11, 2020

(30) Foreign Application Priority Data

May 31, 2017    (DE) ..................... 10 2017 209 094.4

(51) Int. Cl.
*H04B 10/00*    (2013.01)
*G08C 23/04*    (2006.01)
(Continued)

(52) U.S. Cl.
CPC .............. *G08C 23/04* (2013.01); *H04B 10/40* (2013.01); *H04W 4/80* (2018.02); *H04W 76/15* (2018.02); *H05B 47/19* (2020.01); *H05B 47/195* (2020.01)

(58) Field of Classification Search
CPC .......................... H04B 10/116; H04B 10/1149
See application file for complete search history.

(56) References Cited

U.S. PATENT DOCUMENTS 7,688,680 B1    3/2010 Gunasekara et al.
7,995,590 B2    8/2011 Cutaia
(Continued)

FOREIGN PATENT DOCUMENTS

CN    102625479 A    8/2012
CN    104316989 A    1/2015
(Continued)

OTHER PUBLICATIONS

International Search Report based on Application PCT/EP2018/062788 (17 pages), dated Jul. 4, 2018 (for reference purpose only).
(Continued)

*Primary Examiner* — Daniel G Dobson
(74) *Attorney, Agent, or Firm* — Viering, Jentschura & Partner mbB

(57) ABSTRACT

A system may be used for wirelessly transmitting data between a communication terminal positioned in a prescribed area and a remote communication station connected to a communication network. The system may include a lighting arrangement having a lighting device arranged in the prescribed region and at least one transmission device arranged in or directly on the lighting device. The transmission device may be configured to establish a first wireless optical communication connection to the remote communication stations and a second wireless communication to the communication terminal to transmit the data.

18 Claims, 6 Drawing Sheets

(51) Int. Cl.
*H04W 76/15* (2018.01)
*H04W 4/80* (2018.01)
*H04B 10/40* (2013.01)
*H05B 47/19* (2020.01)
*H04J 14/00* (2006.01)
*H05B 47/195* (2020.01)

(56) References Cited

U.S. PATENT DOCUMENTS

| | | | |
|---|---|---|---|
| 8,503,886 B1* | 8/2013 | Gunasekara | H04B 10/116 398/172 |
| 9,600,983 B1 | 3/2017 | Lydecker et al. | |
| 2003/0035169 A1* | 2/2003 | Byers | H04B 10/801 398/79 |
| 2003/0222587 A1* | 12/2003 | Dowling, Jr. | F21S 2/00 315/149 |
| 2006/0067707 A1 | 3/2006 | Maniam et al. | |
| 2011/0286748 A1* | 11/2011 | Davidson | H04B 10/1149 398/118 |
| 2012/0001567 A1 | 1/2012 | Knapp et al. | |
| 2015/0318922 A1 | 11/2015 | Poola et al. | |
| 2015/0334811 A1 | 11/2015 | So | |
| 2016/0309565 A1 | 10/2016 | Tran | |

FOREIGN PATENT DOCUMENTS

| | | |
|---|---|---|
| CN | 105101530 A | 11/2015 |
| CN | 105337665 A | 2/2016 |
| EP | 1858179 A1 | 11/2007 |
| EP | 2924895 A1 | 9/2015 |
| EP | 2945469 A1 | 11/2015 |
| KR | 20100058023 A | 6/2010 |
| WO | 2011137100 A1 | 11/2011 |
| WO | 2016182606 A1 | 11/2016 |

OTHER PUBLICATIONS

German Search Report based on Application No. 10 2017 209 094.4 (12 pages), dated Apr. 30, 2018 (for reference purpose only).
Hussein et al.: "2Gb/s Mobile Indoor Visible Light Communication System Employing Beam Steering and Computer Generated Holograms"; Journal of Lightwave Technology, IEEE Service Center; vol. 33; No. 34; Dec. 15, 2015; pp. 5242-5260.
Karunatilaka et al.: "LED Based Indoor Visible Light Communications: State of the Art"; IEEE Communication Surveys & Tutorials; vol. 17; No. 3; Jan. 1, 2015; pp. 1649-1678.
Elgala et al.: "Indoor Optical Wireless Communication: Potential and State-of-the-Art"; IEEE Communications Magazine; Sep. 2011; pp. 56-62.
First Search for the corresponding Chinese Patent Application No. 201880036502.6 dated Jan. 5, 2021 (Reference purposes only).

\* cited by examiner

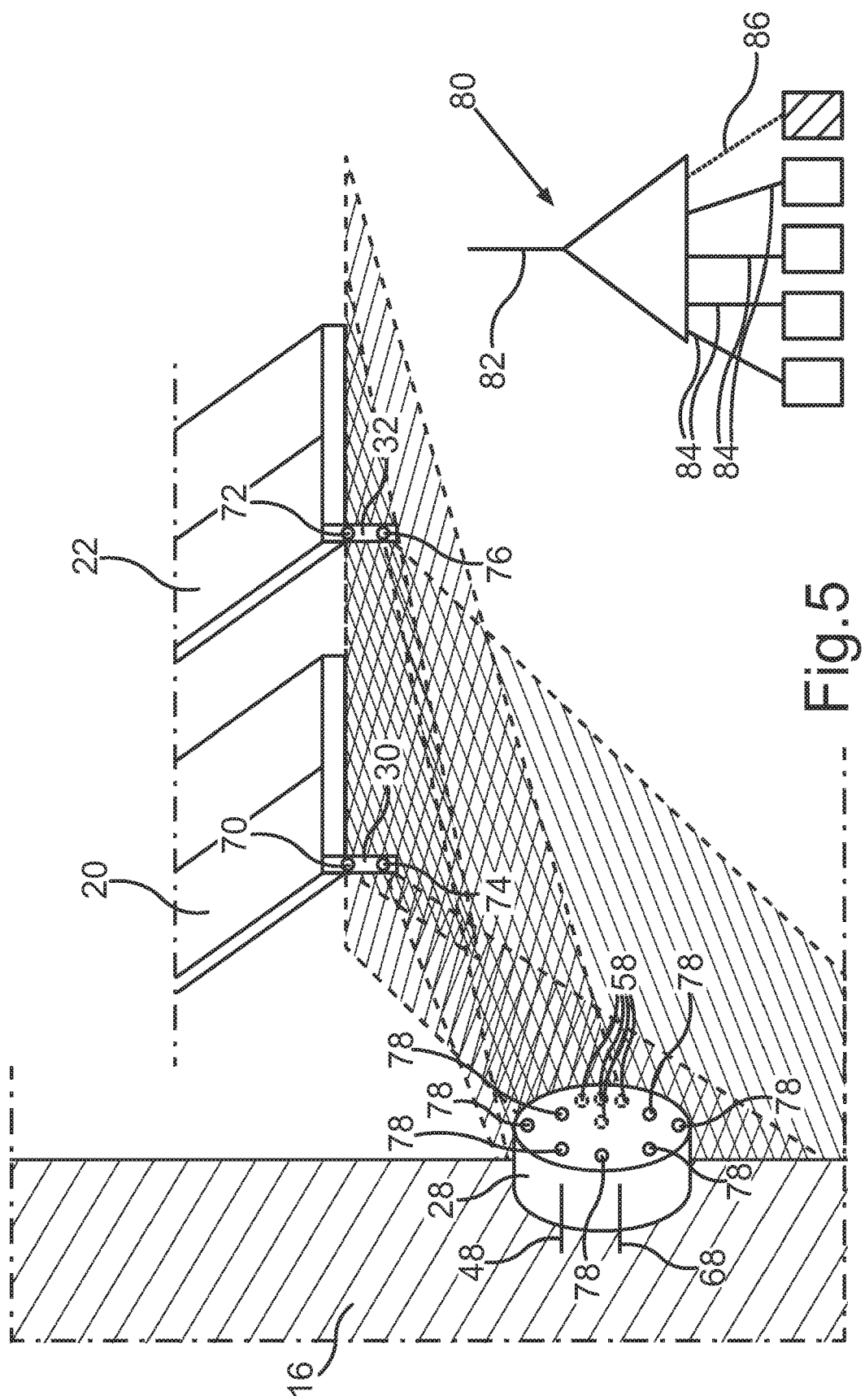

WIRELESS TRANSFER OF DATA BETWEEN A COMMUNICATION TERMINAL ARRANGED IN A PRESCRIBED REGION AND A REMOTE COMMUNICATION STATION

CROSS-REFERENCE TO RELATED APPLICATIONS

The present application is a national stage entry according to 35 U.S.C. § 371 of PCT application No.: PCT/EP2018/062788 filed on May 16, 2018; which claims priority to German Patent Application Serial No.: 10 2017 209 094.4, which was filed on May 31, 2017; both of which are incorporated herein by reference in their entirety and for all purposes.

TECHNICAL FIELD

The invention relates to a lighting arrangement for wirelessly transmitting data between a communication terminal positioned in a prescribed region and a remote communication station connected to a communication network. In addition, the invention relates to a remote communication station having an attachment device for the fixed arrangement of the remote communication station and a communication unit that can be connected to a communication network for establishing a communication connection to at least one lighting arrangement. The invention also relates to a method for wirelessly transmitting data between a communication terminal positioned in a prescribed region and a remote communication station connected to a communication network. Finally, the invention also relates to a system for wirelessly transmitting data between a communication terminal positioned in a prescribed region and a remote communication station connected to a communication network.

BACKGROUND

Lighting arrangements of the generic kind, remote communication stations, generic methods as well as generic systems are very well known in the prior art, which makes separate documentary description of these unnecessary. Systems are used for setting up a communication connection between the communication terminal and the remote communication station, so that data can be transmitted, in particular, to the communication network. In the prior art, for example, a WLAN router can be provided for this purpose. The communication terminal is a mobile communication terminal which is connected to the remote communication station, in particular wirelessly. Such a communication terminal can be, for example, a smartphone, tablet, a PDA, and/or similar device. In addition, the communication terminal can also be a computer however, such as a PC, in particular a desktop PC. The remote communication station is a device, which is suitable for data exchange with the communication terminal. In the simplest case, the remote communication station can also be a communication terminal, as has been explained earlier, or else a PC or similar. In addition, the remote communication station can also be another data processing device, such as a storage unit for storing data. In particular, the remote communication station includes a communication unit, which in turn is connected to a communication network such as the internet, an intranet and/or the like. The remote communication station can therefore be, for example, a gateway or the like.

SUMMARY

The invention is particularly concerned with the question of how wireless communication connections can be established between communication terminals and remote communication stations, in particular the communication network connected to the remote communication stations.

With the increasing need to be able to achieve high data rates and the increasing use of available electrical services, a rapid rise is to be expected, particularly in the case of mobile data rates. The available technologies, based in particular on the WLAN or mobile radio standard, can only contribute to this to a very limited extent or are already in some cases reaching the limits of their technical capacity. In the field of mobile radio, in this respect it is already common practice to provide additional transmitting stations and to distribute them more finely. However, this requires a high level of technical effort and financial cost.

In the area of buildings, in particular the retrofitting of existing buildings, this requires the laying of the necessary cable-based communication paths, for example, based on Ethernet or the like. In the case of new buildings, new technologies such as Power-over-Ethernet or the like can also be used, in which a single cable connection is used to transfer both electrical energy and data.

The object of the invention is to improve the capacity for wireless communication in a simple way.

As the solution, a lighting arrangement is proposed with a remote communication station, and a method and a system as specified in the independent claims.

Further advantageous embodiments result from features of the dependent claims.

With regard to a generic lighting arrangement, it is proposed in particular that it has a lighting device, which can be arranged in the prescribed region, and a transmission device which is arranged in or directly on the lighting device and in order to transfer the data, is designed to establish a first optical wireless communication connection to the remote communication station and a second wireless communication connection to the communication terminal.

With regard to a generic remote communication station, it is proposed in particular that the communication unit is designed to establish the communication connection as a first optical wireless communication connection to a transmission device of the at least one lighting arrangement.

With regard to a generic method it is proposed, in particular, that said method includes the steps:
 establishing a first wireless optical communication connection between the remote communication station and a transmission device of a lighting arrangement, which is arranged in or directly on a lighting device of the lighting arrangement in the prescribed region, and
 establishing a second wireless communication connection between the transmission device and the communication terminal.

In relation to a generic system, it is proposed in particular that the system includes a lighting arrangement, which is arranged in the prescribed region, a remote communication station, a first wireless optical communication connection between the remote communication station and a transmission device of the lighting arrangement, and a second wireless communication connection between the transmission device of the lighting arrangement and the communication terminal.

The lighting arrangement provides a simple way to create additional capacity, for example by allowing transmission devices to be integrated into already existing lighting devices, which creates lighting arrangements that are capable of providing the appropriate communication paths. This means that no additional cable-based connections need to be laid to enable the improved data transfer.

The remote communication station is arranged in an optical line-of-sight from the transmission device, so that data transmission can be provided via a wireless optical communication connection. In this respect, no installation of cables or the like is required. Because the transmission device of the lighting arrangement is also arranged on or in the lighting device of the lighting arrangement, for example by being integrated into a housing of the lighting device or the like, the transmission device also does not need a separate device that would have to be installed at a prescribed point in the prescribed region.

In addition, this design allows the transmission device to be supplied with electrical energy from the lighting device, so that a separate power supply for the transmission device can also be eliminated. This also has the advantage that with regard to an energy supply of the transmission device, no separate cables need to be provided. Particularly in an indoor area, the light is available for use as a powered and uniformly distributed data node to be able to integrate the transmission device.

The first wireless optical communication connection is, in particular, a communication connection which is designed as a near-field communication connection. It is thus particularly well suited for use within buildings, in other words, in the indoor area. The near-field communication connection is characterized by the fact that it is designed for a communication range of up to a few meters, for example, in a range of approximately 0 meters to 25 meters, such as in a range from 0.5 meters to 15 meters.

The transmission device is arranged on the lighting device in such a way that it has an optical line-of-sight to the remote communication station. This makes it possible to establish a direct optical wireless communication connection between the transmission device and the remote communication station. In addition, however, the transmission device can also be retrofitted in an already existing lighting device in order to form a lighting arrangement.

The first wireless optical communication connection itself can be implemented by using light, in particular infrared light, ultraviolet light and/or the like, such as outside of the light range visible to human beings. In this case, the transmission device and also the remote communication station are arranged in such a way that the first optical wireless communication connection is essentially undisturbed by persons located or residing in the prescribed region. The lighting device is therefore particularly arranged on a ceiling of a room in which the prescribed region is at least partly located. The prescribed region can thus be determined by the lighting arrangement, in particular the lighting device thereof, such as by the position of the transmission device.

Likewise, the remote communication station is arranged in an upper region of the room, for example, in an upper area of a wall of the room or even also on the ceiling, so that a largely undisturbed first wireless optical communication connection can be implemented. It can also be provided however, that the remote communication station is arranged in an appropriate manner, for example, on a mast, a post or other component, so that a substantially uninterrupted visual line-of-sight connection to the transmission device can be implemented. The lighting arrangement is therefore particularly advantageously suitable for use in closed rooms of buildings, for example, in halls, conference rooms and/or the like. In addition, however, the lighting arrangement can equally well be used in specified outdoor areas, which are illuminated by means of lighting devices, for example. For example, this can be implemented in waiting areas in railway stations or the like. Here, also, the transmission device can be arranged in a lighting device to form the lighting arrangement. The remote communication station may be positioned, for example, on an external wall of a station building or the like, so that an uninterrupted visual line-of-sight connection can be implemented.

In a non-limiting embodiment, the remote communication station is a communication device, which in turn is connected to a communication network such as the internet, an intranet and/or the like. To this end, the communication station includes a communication port. This means that it is possible to connect communication terminals which are in communication with the transmission device via the second wireless communication connection to the communication network via the remote communication station. In this context, it has proved advantageous that very high data rates can be achieved with the first wireless optical communication connection due to its physical properties. This makes it possible not only to provide a communication connection to a single communication terminal with a high data rate, but even when a plurality of communication terminals are to be connected. In addition, it is now possible to connect more than one lighting arrangement or transmission device to the remote communication station using communication techniques via the first optical wireless communication connection and in this way, so to speak, providing a private communications network in a specified room.

Of course, it can be stipulated that for each lighting arrangement or transmission device a separate remote communication station assigned thereto is provided. It proves to be particularly advantageous, however, if a plurality of lighting arrangements or transmission devices can share the use of a remote communication station, in particular if they are used for connection to a communication network. The remote communication station in this context can be designed as a gateway or include a gateway.

It is possible in a simple way to provide a communication facility or to improve an existing communication facility in existing rooms or outdoor areas. Because, for example, transmission devices can be arranged in or on existing lighting devices in order to form lighting arrangements, a separate cable-bound communication infrastructure does not need to be additionally retrofitted or provided. In this case, only the transmission device therefore needs to be provided on the lighting device. Accordingly, a corresponding remote communication station must be provided which, even if it might be a communication terminal or any other data processing device such as a data storage device or the like in its own right, provides a connection to the communication network such as the internet.

The transmission device can also include a separate housing or a mounting frame or the like. In a non-limiting embodiment, however, it is equipped only with a fastening means which allows the transmission device to be mounted on or in the lighting device, or integrated therein. For example, the fastening means can be formed by a fastening strap, which can be connected to a housing or a frame of the lighting device with a clip and/or a screw or the like. This allows the lighting arrangement to be easily formed.

The second wireless communication connection is used for establishing the communication connection between the lighting arrangement or transmission device and the communication terminal. This is also a near-field communication connection, which allows the communication terminal which is located in the prescribed region to be brought into communication connection with the transmission device. The prescribed region is therefore defined by the position of the lighting arrangement or transmission device and its transmission and/or reception characteristics, among other things. In a non-limiting embodiment, the prescribed region corresponds essentially to the region which is illuminated by means of the lighting device of the lighting arrangement in the intended lighting operation. It is thereby immediately apparent to a user of the communication terminal how far the prescribed region extends, so that the user can choose their position of residence in the prescribed region to be able to ensure a reliable communication connection to the lighting arrangement or transmission device.

Of course, if there are a plurality of lighting arrangements or transmission devices which are arranged, for example, on the same lighting device or on different lighting devices, such as adjacently arranged, it can also be provided that overlaps of the prescribed regions can occur so that the communication terminal can establish a communication connection not only to a single lighting arrangement or transmission device, but to two or even more lighting arrangements or transmission devices, according to the overlap of the respective prescribed regions.

The lighting arrangements may be used in closed rooms where, for example, work spaces, for example desks or the like are illuminated by means of ceiling lights, for example. By arranging the lighting arrangement or the transmission device on the respective lighting device, the second wireless communication connection can be produced in a simple manner, especially if the light is mounted on the ceiling. With this design it is also possible for the second wireless communication connection also to be designed essentially as a near-field connection and also essentially undisturbed.

In accordance with an extension it is proposed that the transmission device has an optical transceiver unit for establishing the first wireless optical communication connection to the remote communication station. As a result, it is possible to provide a specific type of communication connection which can be designed to be inexpensive and/or energy efficient and at the same time allow a high data transfer rate. In addition, specific components and assemblies can be used which are suitable for correspondingly high data transfer rates, for example, based on a light fidelity (Li-Fi) system. In a non-limiting embodiment, the remote communication station has a suitably adapted optical transceiver unit.

The optical transceiver unit is advantageously designed to emit and/or to receive light in a frequency range individually assigned to the transmission device. In particular, the light can be emitted and/or received with a color individually assigned to the transmission device. Not only does this allow a particularly secure, in particular interference-proof, communication connection to be achieved, but it also allows more than one transmission device to connect to a remote communication station and/or vice versa, such as using independent first wireless optical communication connections. It can thus be provided that in the case of more than one transmission device each of the transmission devices is allocated a separate, individually assigned frequency range. This allows the remote communication station, by communicating in the respective frequency range, to make a selection as to which of the communication devices it uses to maintain the communication connection. In principle, this can of course also be provided in reverse, for example, if one transmission device maintains the first wireless optical communication connection to more than one single remote communication station. Here, it can then be stipulated that by selecting the respective frequency range the remote communication station is selected by the transmission device. This design is particularly advantageous when remote communication stations are used as relay stations, to be able to couple additional transmission devices using communication techniques that would otherwise not be in communication range, for example because no wireless optical communication connection is possible due to obstacles or the like.

In a non-limiting embodiment the optical transceiver unit has an optical transmission element, which is designed, in order to establish the first wireless optical communication connection, to emit the light directed in the direction of the remote communication station. For this purpose the transmission element can have a suitable light source that can be modulated according to the data to be transmitted, for example, a light-emitting diode, a laser diode, combination circuits thereof, or the like. In addition, the transmission element can also include optical elements, for example a mirror, a prism, a lens, combinations thereof and/or the like. This makes it possible to emit the light in the direction of the remote communication station so that it is as fully available as possible for the communication connection. As a result areas of space that are not positioned in the direction of the remote communication station do not need to be exposed to the light of the transmission element. In principle, this also applies to the reverse case, of course, in which the remote communication station has a corresponding transceiver unit with an optical transmission element.

It is also proposed that the optical transceiver unit is designed to align the optical transmission element and/or an optical receiving element of the optical transceiver unit toward the remote communication station, such as automatically. This configuration has proven to be particularly advantageous for the installation of a system. For example, if transmission devices are fitted retrospectively to lighting devices and one or more corresponding remote communication stations are installed, in particular, on account of a respective arrangement a solid angle in which the light is to be emitted may need to be adjusted, so that the first wireless optical communication connection to the remote communication station can be established. For this purpose, one or more mechanically movable light deflection elements can be provided or else a mechanically movable light source with respect to the transmission element. It proves to be particularly advantageous if the transmission device has a control unit that allows the alignment to be performed at least partly automatically. For example, it can be provided that a solid angle is specified, which is then realized by automatically setting the transmission element.

The optical receiving element can be formed, for example, by a photodiode, a photoresistor, a phototransistor or by a different photo-sensitive component.

In accordance with an extension, it is proposed that the optical transceiver unit is designed to focus the emitted light onto a receiving element of the remote communication station assigned to the transmission device. This allows the first optical wireless communication connection to be implemented with a particularly low energy consumption. This means that a high degree of efficiency for the communication connection can be achieved.

In addition, it is proposed that the transmission device has a near-field radio unit for establishing the second wireless communication to the communication terminal. In this way, it is possible to establish the near-field communication connection to the communication terminal in a simple manner. For the second wireless communication connection a suitable radio standard can be used, for example, WLAN, Bluetooth, ZigBee or the like. This has the advantage that existing communication terminals, which are often already designed for using such standards, can be easily coupled using communication techniques. With regard to the communication terminal therefore, no new technologies need to be provided. In addition, because the near-field radio unit is part of the transmission device, in particular integrated into the latter, it can be supplied with electrical energy via the transmission device at the same time so that a separate power supply connection can be omitted. This has the advantage that the effort required for the installation of a system can be reduced.

Alternatively or additionally, it can also be provided that the transmission device has an optical communication unit for establishing the second wireless communication to the communication terminal. The second wireless communication connection can thus also alternatively or additionally be designed as a visual communication connection, for example, comparable to the first wireless optical communication connection. In this case, however, it is necessary that the communication terminal also has a transmitting and receiving unit suitable for this purpose so that the second wireless communication connection can be established in a correspondingly optical manner. To this end, the optical communication unit can be designed in the same way as the optical transceiver unit. Of course, the optical communication unit can also be combined with a near-field radio unit to enable as broad a communication spectrum as possible to be provided for the second wireless communication connection. This means that a communication technology-based connection can be offered for a plurality of different communication terminals.

It is also proposed that the second wireless communication connection is an optical communication connection and the transmission device has an optical light deflection element for optically connecting the first wireless optical communication connection to the second wireless communication connection. This design makes it possible to realize a very simple transmission device, because a data conversion within the transmission device for coupling the two communication connections can be omitted. This proves to be particularly advantageous if the transmission device implements the coupling of the two communication connections by means of the optical light deflection element, which can be formed, for example, by a mirror, a lens, a prism, or combinations thereof or the like. This design also has the advantage that, depending on the design, it may not even require its own power supply because it can be composed solely of passive components. Of course, optical amplification elements or the like can also be provided, which allow signals corresponding to data that are received via one of the two communication connections to be amplified optically and emitted again via the other of the two communication connections. In this case, of course, a power supply is necessary in order to be able to provide the required energy.

The transmission device has a power supply connector for connecting to a power supply unit of the lighting device. With regard to the energy supply, the transmission device can therefore be coupled to an already existing power supply for the lighting device, for example. In this case, therefore, a separate power supply does not need to be provided for the transmission device.

It is further proposed that the communication unit for the transmission device of the at least one lighting arrangement has an optical transmission element that can be individually assigned to the transmission device and/or an optical receiving element that can be individually assigned to the transmission device. It can be provided that the transmission element is aligned to the transmission device assigned to the transmission element, so that light emitted by the transmission element can be received exclusively by this transmission device. This proves to be particularly advantageous if the transmission element is designed to focus emitted light onto the assigned transmission device. The same can also be provided for the optical receiving element. Thus, for example, it can be provided that the optical receiving element has a preferential receiving direction, which is oriented toward the assigned transmission device. For example, this can be carried out using light deflection means, for example, lenses, prisms, mirrors and/or the like. The optical receiving element is oriented in such a way that it can receive light substantially exclusively from the assigned transmission device. This makes it possible to selectively provide first wireless optical communication connections for each of the transmission devices present. A channel capacity of the first wireless optical communication connection therefore does not need to be shared by multiple transmission devices. This allows a high data rate between the remote communication station and the transmission device.

It is also proposed that the communication unit is designed to emit and/or to receive light for the first wireless optical communication connection to the transmission device of the at least one lighting arrangement in a frequency range individually assigned to the at least one transmission device. This allows a selective communication channel to be achieved between any one of a plurality of transmission devices and the remote station. Between the remote communication station and the transmission devices individual communication channels can therefore be obtained which, in particular, can be operated substantially independently of one another. The assignment can initially be carried out either by a manual setting or automatically, for example by the remote communication station transferring a respective frequency range to the transmission device or the like.

In accordance with an extension, it is proposed that the remote communication station has a registration unit which is designed to receive an initiation signal, which is emitted by the transmission device of the at least one lighting arrangement and is individually assigned to the at least one transmission device, and to establish the first wireless optical communication connection to the at least one transmission device on an individualized basis. In accordance with this embodiment it is thus possible that the first wireless optical communication connection only needs to be provided if required. It is therefore not necessary to maintain the first wireless optical communication connection when no data transmission is taking place. In addition, this extension can be used to provide additional transmission devices in a simple way and accordingly to be able to set up individualized first wireless optical communication connections. For this purpose, a corresponding registration protocol can be provided, which enables the transmission device to be brought automatically into communication connection with the remote communication station.

It is also proposed that the wireless transmission of the data takes place via the first wireless optical communication connection in a frequency range individually assigned to the transmission device. This allows a selectivity to be achieved with regard to communication channels.

It is also proposed that the data transmitted via the first wireless optical communication connection are encrypted with an encryption algorithm associated with the transmission device. As a result of this design it is possible not only to achieve a selectivity with respect to the data transmission but also, if the data transferred by the remote communication station can be received by multiple transmission devices, to ensure that only the transmission device that has a corresponding decryption facility is able to use the transmitted data. For the other transmission devices, these data are then essentially unusable.

It is also proposed that for establishing the first wireless optical communication connection the transmission device logs into the remote communication station with a unique identification. The individual identification can be contained, for example, in the form of data in the initiation signal which is individually assigned to the transmission device. The individual identification is a unique identification, which has only been assigned for a single transmission device. In this way, transmission devices of any composition can be identified by remote communication stations or else by other stations for which this information is relevant.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which:

FIG. 5 a schematic drawing as per FIG. 4, but in which a parallelized communication over different frequency ranges is provided bi-directionally;

FIG. 6 a schematic drawing of a selection unit for selecting a specified frequency range.

DETAILED DESCRIPTION

Figure 1:
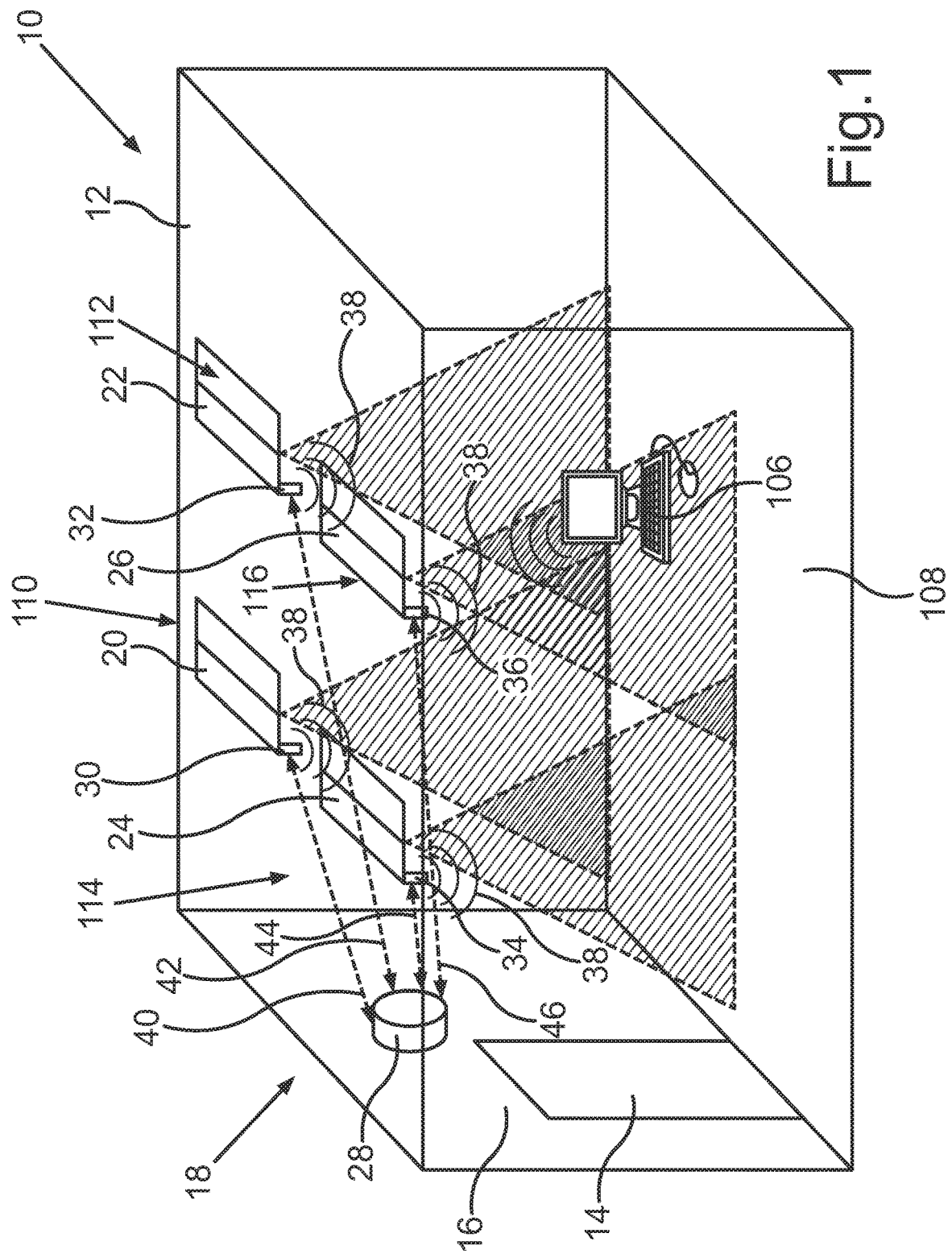
FIG. 1 a schematic perspective view of a communication system for a room of a building with four lighting arrangements, each of which has a lighting device and a transmission device, and a remote communication station which is arranged on one wall of the room.

FIG. 1 shows a schematic perspective view of a room 10 of a building, not shown in detail, which includes an approximately rectangular floor area 108, for example, at the outer edges of which walls, such as the wall 16, are arranged. Facing the floor area 108, the room 10 has a ceiling 12 which terminates with the walls 16. An access hole lockable with a door 14 is provided in the wall 16.

On the ceiling 12 on the room side four lighting arrangements 110, 112, 114, 116 with corresponding lighting devices 20, 22, 24, 26 are arranged, which are not shown in further detail. The lighting devices 20, 22, 24, 26 each have at least one lighting means, with which when the light is operated as intended, light can be emitted into the room 10. This allows the room 10 to be illuminated in a definable way. The lighting devices 20, 22, 24, 26 are controllable by means of a lighting controller, not shown in detail. Via the light controller the lighting devices 20, 22, 24, 26 are supplied with electrical power so that the lighting means can realize the intended lighting function by converting electrical energy into light. For this purpose, each of the lighting devices 20, 22, 24, 26 includes a ballast device, not shown in detail, by means of which the electrical energy supplied is converted in an appropriate manner for the lighting means. In addition to gas discharge lamps, incandescent lamps, light emitting diodes and/or the like can also be provided as lighting means. Due to the arrangement of the lighting arrangements 110, 112, 114, 116 or the lighting devices 20, 22, 24, 26, the lighting devices 20, 22, 24, 26 emit their light downward toward the floor area 108.

The room 10 also includes a communication system 18 which is used to connect communication terminals arranged in the room 10, such as the desktop PC 106 shown only as an example, wirelessly to a communication network 48, in this case, the internet. To this end, each of the lighting devices 20, 22, 24, 26 has a Luminaire-Com-Unit (LCU) 30, 32, 34, 36 as a transmission device, which in the present case is fastened directly to the respective lighting device 20, 22, 24, 26, here namely a respective housing.

In the design according to FIG. 1 it is provided that each LCU 30, 32, 34, 36 includes a separate WLAN unit which is used to provide a wireless near-field radio connection as the second wireless communication connection 38, by means of which the communication terminal 106 can enter into a wireless communication connection. The communication system 18 also includes a remote communication station in the form of a Wall-Com-Unit (WCU) 28 which by means of fastening means, not shown in detail, is fastened at a fixed position in an upper region of the wall 16 a significant distance above the door 14. The WCU 28, as will become clear in the following, is in communication connection via connectors, not shown in FIG. 1, with the communication network 48, here the internet. In addition, the WCU 28 is connected to a power supply cable 68 of an electrical power supply of the building (not shown) (FIG. 2).

In the design according to FIG. 1 it is provided that each of the LCUs 30, 32, 34, 36 is in communication connection with the WCU 28 via a respective first wireless optical communication connection 40, 42, 44, 46. The first wireless optical communication connection 40, 42, 44, 46 in this case is formed on the basis of Li-Fi (Light Fidelity) which stands for a method of optical data transmission over short distances, which is an optical equivalent to the wireless technology standard WLAN. Via the first wireless optical communication connections 40, 42, 44, 46, the LCUs 30, 32, 34, 36 are in communication connection with the WCU 28. By the arrangement of the communication system 18 below the ceiling but in close proximity to the ceiling 12, the first wireless optical communication connections 40, 42, 44, 46 are essentially undisturbed, thus enabling a reliable data transmission between the LCUs 30, 32, 34, 36 and the WCU 28.

The WCU 28 in the present case is designed in the manner of a gateway, so that optically received data are appropriately converted and can be forwarded to the connected internet and vice versa. This is also provided for the transmission devices 30, 32, 34, 36 in this embodiment, which establish a coupling of the first wireless optical communication connections 40, 42, 44, 46 to the respective second wireless communication connections 38.

Figure 2:
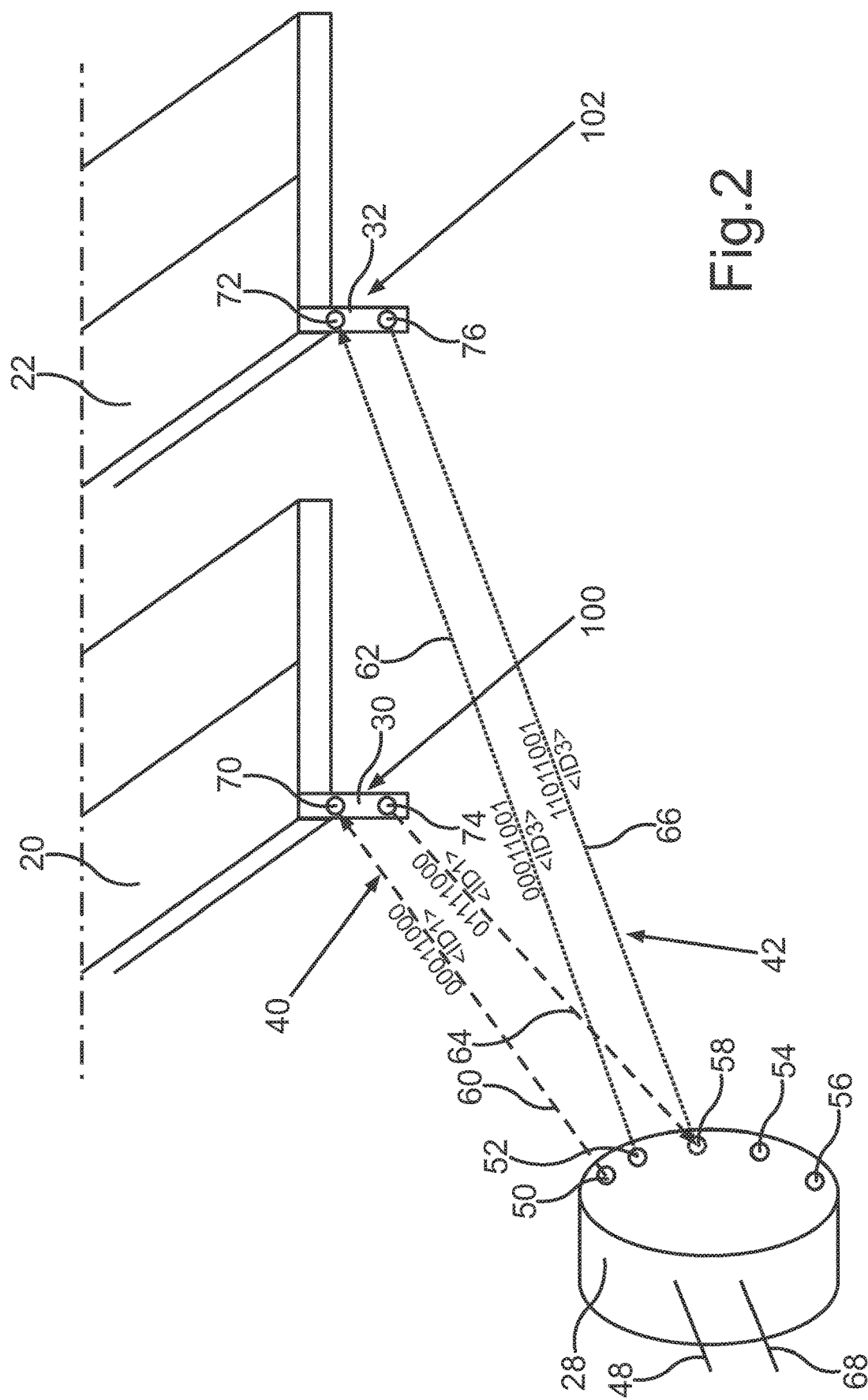
FIG. 2 a schematic enlarged perspective drawing of a detail of FIG. 1, in which two of the lighting arrangements are in communication connection with the remote communication station and the remote communication station has a photodiode element for each of the transmission devices assigned thereto as a transmission element.

FIG. 2 shows a schematic detail of the communication system 18 according to FIG. 1, with which the functionality according to a further embodiment is shown in concrete terms. In this embodiment, it is provided that the WCU 28 is connected to the internet via a data cable to the communication network 48. Via the power supply cable 68 the WCU 28 receives electrical power from an electrical building supply, not shown in detail, for the intended operation. The WCU 28 also includes light-emitting diodes 50, 52, 54, 56 as transmission elements, wherein each of the light-emitting diodes 50, 52, 54, 56 is assigned to one of the existing LCUs 30, 32, 34, 36 for the purposes of data transmission from the WCU 28 to the LCU 30, 32, 34, 36. They are appropriately aligned with respect to a light emission.

In FIG. 2 only two of the LCUs are shown, namely the LCU 30 and the LCU 32. The LCU 30 has a transceiver unit 100, which in turn includes a photodiode 70 for receiving data from the WCU 28. Using the photodiode 70 light signals transmitted by the LED 50 via a light channel 60 can be received by the WCU 28 and the data contained therein can be determined. Similarly, the transceiver unit 100 includes a light-emitting diode 74 as the transmission element, by means of which lighting signals can be emitted for transmitting data from the LCU 30 to the WCU 28. The WCU 28 includes a photodiode 58 as a receiving element for this purpose.

The light signals transmitted from the LED 74 over a light channel 64 can be received by the photodiode 58 of the WCU 28 and the data contained therein can be determined. These are then converted accordingly and sent to the internet via the data cable to the communication network 48.

In principle, a comparable situation applies with regard to the second LCU 32, which includes a transceiver unit 102 with a photodiode 72 as a receiving element and a light-emitting diode 76 as a transmission element. The light-emitting diode 52 of the WCU 28 is connected to the photodiode 72 via an optical communication channel as a light channel 62. Accordingly, a wireless optical communication channel 66 is provided, by means of which light from the light-emitting diode 76 is transmitted to the photodiode 58 of the WCU 28. The light channels 60, 64 form a first one of the first wireless optical communication connections 40, whereas the light channels 62, 66 form a second of the first wireless optical communication connections 42. The other two LCUs 34, 36 are connected to the WCU 28 in an appropriate way, in each case one of the light-emitting diodes 54, 56 being assigned to the respective LCUs 34, 36.

In the present embodiment it is provided that each LCU 30, 32, 34, 36 is assigned its own identification ID1, ID2, ID3, ID4. It is provided that at least at the beginning of the emission of light and, if applicable, also during the continued light emission, the respective assigned identification is transmitted, thus enabling an assignment of the data.

In accordance with an extension it is provided that the light-emitting diodes 74, 76 of the LCUs 30, 32 are aligned such that their emitted light is focused at the photodiode 58 of the WCU 28. Similarly, the light-emitting diodes 50, 52 are focused on the respectively assigned photodiodes 70, 72 of the LCUs 30, 32. This allows an undisturbed data transmission to be implemented.

Figure 3:
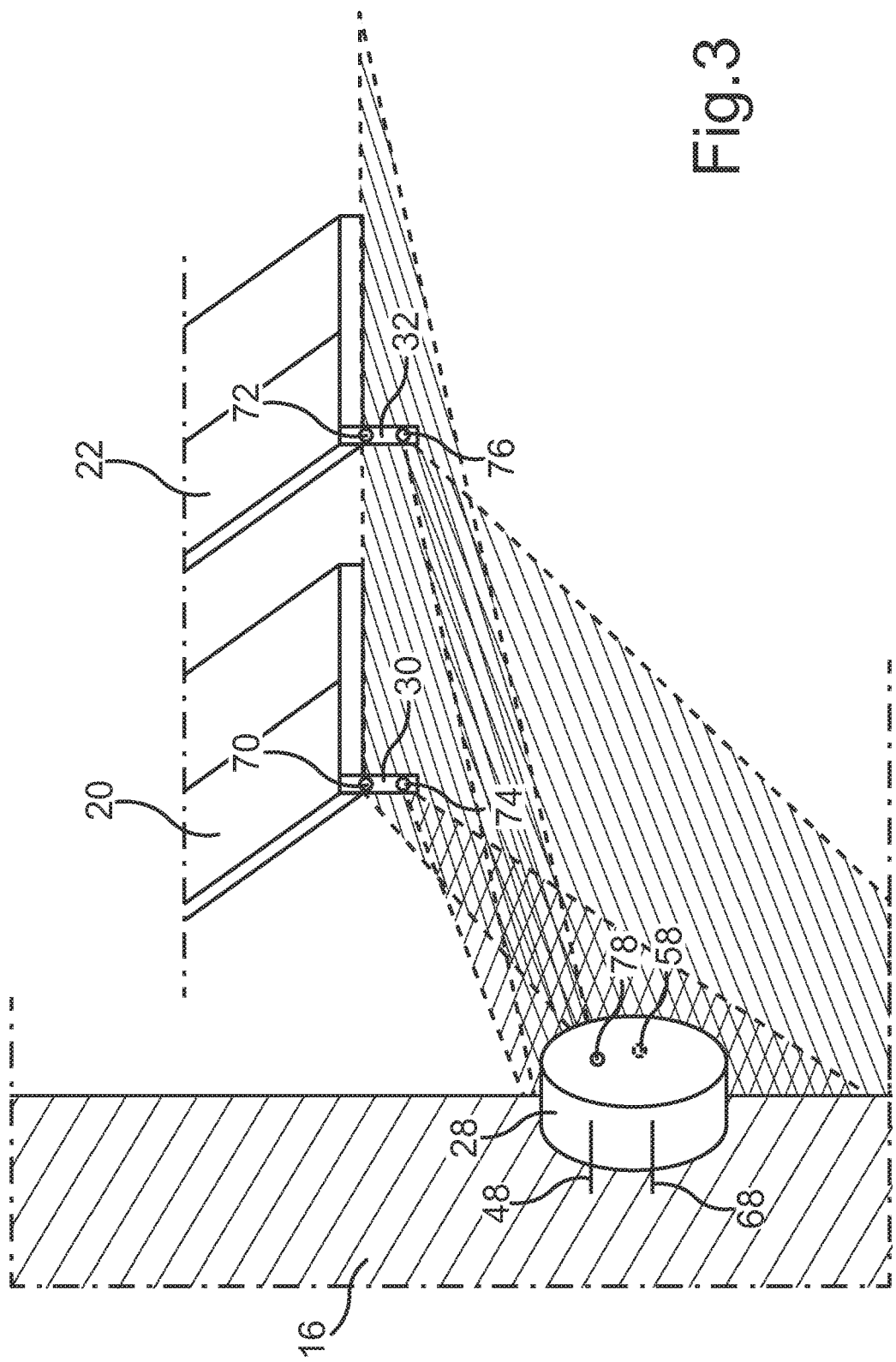
FIG. 3 a schematic drawing as per FIG. 2, but in which a multiple access solution is provided.

FIG. 3 shows a further embodiment of a communication system as the communication system 18 of FIG. 1, wherein here in contrast to the embodiment according to FIG. 1 a multiple access solution for the bi-directional data transmission via the first wireless optical communication connections 40, 42, 44, 46 is provided between the WCU 28 and the LCUs 30, 32, 34, 36. Multiple access in communication engineering refers to a series of methods for the allocation of transmission capacity of a data transmission system among stations connected to the data transmission system. Multiple access can be implemented in different ways for the purposes of the present embodiment, for example, as Time Division Multiple Access (TDMA), in which data are transmitted in blocks according to a time-division multiplexing procedure. In addition, a token method or a Carrier Sense Multiple Access (CSMA) procedure can also be provided. Furthermore, a code-division multiplexing method, for example, Code Division Multiple Access (CDMA) or the like, can also be used. It is also possible to provide a spatial multiplexing in the manner of Space Division Multiple Access (SDMA) or the like. For this reason in the embodiment in accordance with FIG. 3, in contrast to the embodiment in accordance with FIGS. 1 and 2, only a single LED 78 is provided in the WCU 28 as a common transmission element, by means of which the first wireless optical communication connections 40, 42, 44, 46 can be set up jointly.

Figure 4:
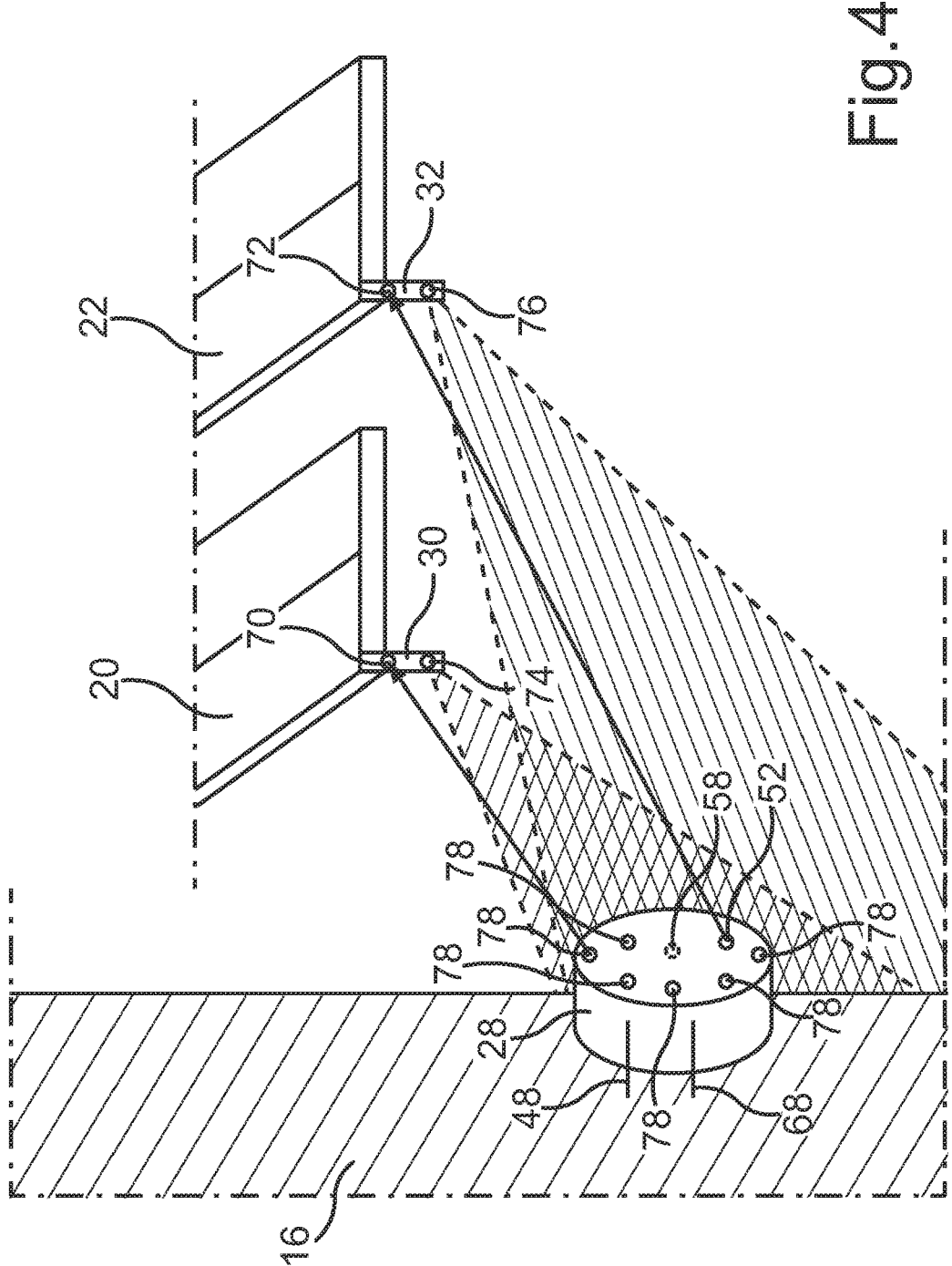
FIG. 4 a schematic drawing as per FIG. 2, but in which a parallelized communication over different frequency ranges is provided from the remote communication station to the transmission device and for the one data transmission from the transmission devices to the remote communication station a multiple access solution is provided.

FIG. 4 shows a further design of a communication system 18, which is based on the embodiment in accordance with FIG. 3, and so for further information reference is made to the relevant comments. In this embodiment it is provided that a multiple access solution is implemented for the communication from the LCUs 30, 32, 34, 36 to the WCU 28. For the reverse communication path, in other words from the WCU 28 to the LCUs 30, 32, 34, 36 a parallelized communication is provided instead, which is based on the use of light in a frequency range individually assigned to the respective transmission devices 30, 32, 34, 36. Accordingly, in the WCU 28 light-emitting diodes 78 are provided as transmission elements, wherein each of the light-emitting diodes 78 emits light in the individually assigned frequency range. The other boundary conditions correspond to the explanations that have already been given for the previous examples, and so for further information reference is made to the relevant comments.

A further embodiment of a communication system 18 is obtained from FIG. 5. The design according to FIG. 5 is based on the design according to FIG. 4, wherein in this respect it is provided that a parallelized communication is provided bidirectionally, in other words both for the data transmission from the WCU 28 to the LCUs 30, 32, 34, 36 and vice versa. Accordingly, the light-emitting diodes 74, 76 in the LCUs 30, 32, 34, 36 are also designed for a corresponding light emission in the frequency range assigned to the respective LCU 30, 32, 34, 36. The same applies to the receiving side, namely the photodiodes 70, 72 as receiving elements. A corresponding modified design is also present in the case of the WCU 28, which also has light-emitting diodes 78 that emit their light in a respective frequency range, whereas photodiodes 58 are designed for a corresponding reception in the respective frequency range. This enables a communication of the LCUs 30, 32, 34, 36 with the WCU 28 to be carried out independently of one another.

In order to allow a distinction to be made between the frequency ranges, it may be provided that a corresponding optical unit 80 is provided on the receiver side (FIG. 6), which may include, for example, a prism or the like. This allows incident light 82 to be separated into the different frequency ranges, so that the frequency ranges 84, 86 are available on the outlet side. It can thus be provided that only the light from the frequency range 86 is supplied to the further processing, because it corresponds to the individually assigned frequency range. The other frequency ranges are then ignored. The optical unit 80 can be provided in the same way in both the WCU 28 and the LCUs 30, 32, 34, 36 to allow a splitting of received light.

In addition, of course, the possibility also exists of using laser diodes as transmission elements, and to align them to an assigned receiving element. This can of course allow particularly high data rates to be achieved with minimal interference. However, the effort involved in the assembly is higher, because a corresponding alignment of the laser light is required.

Figure 7:
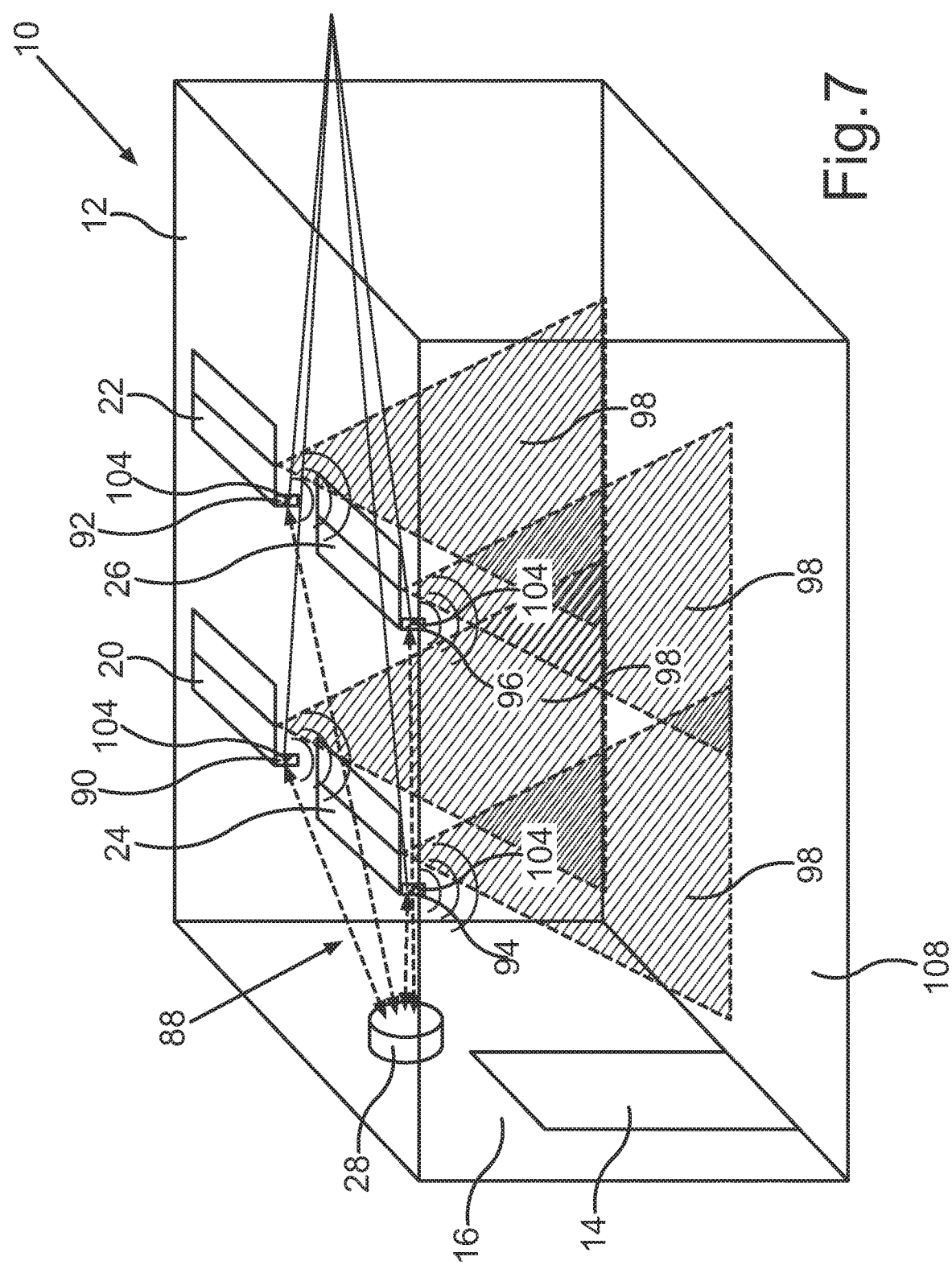
FIG. 7 a schematic representation as per FIG. 1, in which the transmission device includes a light deflection element.

A further advantageous design for a communication system 18 can be derived from FIG. 7, this design being based on the design in accordance with FIG. 1. In contrast to the embodiment according to FIG. 1 LCUs 90, 92, 94, 96 are provided, each of which has an optical unit 104. By means of the optical unit 104 the first wireless optical communication connections 88 are deflected by the WCU 28 and coupled to the second wireless communication connections 98. In the simplest case, the optical unit 104 can be formed by a mirror, a lens, a prism, combinations thereof and/or the like. The LCUs 90, 92, 94, 96 in this case do not require any electrical power supply because they are designed purely as passive elements. In addition, of course, a signal amplification and/or adjustment of the LCUs 90, 92, 94, 96 can be provided, which then of course also requires a corresponding power supply. Unlike in the embodiment according to FIG. 1, in the design according to FIG. 7 it is then necessary, however, that the communication terminal 106 is designed to be able to establish an optical communication connection. A near-field radio unit, such as is provided in the LCUs 30, 32, 34, 36 in accordance with FIG. 1, can thus be eliminated.

Even if only a single WCU is provided for a room in the previous embodiments, nevertheless of course two or more WCUs can also be provided. The WCUs can then also be linked to each other using communication techniques.

It is thus possible, in particular also retrospectively, to install a communications infrastructure such as the communication system 18, such as in buildings. Even in newly constructed buildings the lighting arrangement proves to be advantageous, because no elaborate installations for communications technology have to be allowed for. The lighting arrangement proves to be particularly advantageous when using Li-Fi or the like. It is not limited to this, however. The lighting arrangement can also of course be used in defined outdoor areas, such as a meeting place and/or the like.

The embodiments are used only for explaining the invention and are not intended to limit its scope. Thus, of course, the transmission devices and the remote communication station can be designed in a great variety of ways without departing from the idea of the invention. In addition, the effects and benefits specified for the lighting arrangement or transmission device also apply equally to the remote communication station, the lighting device connected to the transmission device, the system or communication system as well as the method, and vice versa. Accordingly device features can also be formulated as method features and vice versa.

LIST OF REFERENCE NUMERALS 10 room
12 ceiling
14 door
16 wall
18 communication system
20 lighting device
22 lighting device
24 lighting device
26 lighting device
28 WCU
30 LCU
32 LCU
34 LCU
36 LCU
38 communication connection
40 communication connection
42 communication connection
44 communication connection
46 communication connection
48 communication network
50 light-emitting diode
52 light-emitting diode
54 light-emitting diode
56 light-emitting diode
58 photodiode
60 light channel
62 light channel
64 light channel
66 communication channel
68 power supply cable
70 photodiode
72 photodiode
74 light-emitting diode
76 light-emitting diode
78 light-emitting diode
80 optical unit
82 light
84 frequency ranges
86 frequency range
88 communication connections
90 LCU
92 LCU
94 LCU
96 LCU
98 communication connections
100 transceiver unit
102 transceiver unit
104 optical unit
106 communication terminal
108 floor area
110 lighting arrangement
112 lighting arrangement
114 lighting arrangement
116 lighting arrangement

The invention claimed is:

1. A lighting arrangement for wirelessly transmitting data between a communication terminal positioned in a prescribed region and a remote communication station connected to a communication network, wherein the lighting arrangement comprises:
a lighting device arranged in the prescribed region; and
a transmission device arranged in or directly on the lighting device and configured to establish a first wireless optical communication connection to the remote communication station and a second wireless communication connection to the communication terminal to transmit the data; and wherein the transmission device is a near-field radio unit configured to establish the second wireless communication connection to the communication terminal.

2. The lighting arrangement as claimed in claim 1, wherein
the transmission device has an optical transceiver unit configured to establish the first wireless optical communication connection to the remote communication station.

3. The lighting arrangement as claimed in claim 2, wherein
the optical transceiver unit is configured to emit and/or to receive light in a frequency range individually assigned to the transmission device.

4. The lighting arrangement as claimed in claim 2, wherein
the optical transceiver unit has an optical transmission element configured to establish the first wireless optical communication connection; and wherein the optical transmission element is configured to emit the light directed in the direction of the remote communication station.

5. The lighting arrangement as claimed in claim 4, wherein
the optical transceiver unit is configured to align the optical transmission element and/or an optical receiver element of the optical transceiver unit toward the remote communication station.

6. The lighting arrangement as claimed in claim 4, wherein
the optical transceiver unit is configured to focus the emitted light onto a receiver element of the remote communication station assigned to the transmission device.

7. The lighting arrangement as claimed in claim 1, wherein
the transmission device has a further optical transceiver unit configured to establish the second wireless communication connection to the communication terminal.

8. The lighting arrangement as claimed in claim 1, wherein
the second wireless communication connection is an optical communication connection and the transmission device is an optical light deflection element configured to optically connect the first wireless optical communication connection to the second wireless communication connection.

9. The lighting arrangement as claimed in claim 1, wherein
the transmission device has a power supply connection for connecting to a power supply unit of the lighting device.

10. A system for wirelessly transmitting data between a communication terminal positioned in a prescribed region and a remote communication station connected to a communication network, wherein the system comprises:
a lighting arrangement as claimed in claim 1, which is arranged in the prescribed region;
a remote communication station comprising;
an attachment device for a fixed arrangement of the remote communication station; and
a communication unit connectable to a communication network; and wherein the communication unit is configured to establish a communication connection to at least one lighting arrangement as a first wireless optical communication connection to at least one transmission device of the at least one lighting arrangement
a first optical wireless communication connection between the remote communication station and at least one transmission device of the lighting arrangement; and
a second wireless communication connection between the at least one transmission device of the lighting arrangement and the communication terminal.

11. A remote communication station comprising:
an attachment device for a fixed arrangement of the remote communication station; and
a communication unit connectable to a communication network; and wherein the communication unit is configured to establish a communication connection to at least one lighting arrangement as a first wireless optical communication connection to at least one transmission device of the at least one lighting arrangement and wherein the transmission device is a near-field radio unit configured to establish a second wireless communication connection to a communication terminal.

12. The remote communication station as claimed in claim 11, wherein
the communication unit has an optical transmission element configured to be individually assigned to the at least one transmission device and/or an optical receiver element configured to be individually assigned to the at least one transmission device.

13. The remote communication station as claimed in claim 11, wherein
the communication unit is configured to emit and/or to receive light for the first wireless optical communication connection in a frequency range individually assigned to the at least one transmission device.

14. The remote communication station as claimed in claim 11, wherein
a registration unit which is configured to receive an initiation signal, which is emitted by the at least one transmission device and is individually assigned to the at least one transmission device, and wherein the registration unit is configured to establish the first wireless optical communication connection to the at least one transmission device of the at least one lighting arrangement on an individualized basis.

15. A method for wirelessly transmitting data between a communication terminal positioned in a prescribed region and a remote communication station connected to a communication network, wherein the method comprises:
establishing a first wireless optical communication connection between the remote communication station and at least one transmission device of a lighting arrangement arranged in or directly on a lighting device of the lighting arrangement positioned in the prescribed region; and
establishing a second wireless communication connection between the at least one transmission device and the communication terminal; and wherein the transmission device is a near-field radio unit configured to establish the second wireless communication connection to the communication terminal.

16. The method as claimed in claim 15, wherein
the wireless transfer of the data is carried out via the first wireless optical communication connection in a frequency range individually assigned to the at least one transmission device.

17. The method as claimed in claim 15, wherein the data transmitted via the first wireless optical communication connection are encrypted with an encryption assigned to the at least one transmission device.

18. The method as claimed in claim 15, wherein establishing the first wireless optical communication connection with the at least one transmission device occurs by logging into the remote communication station with a unique identification.

\* \* \* \* \*